United States Patent

[11] 3,597,078

| [72] | Inventor | Yoshio Miyauchi<br>Hikone, Japan |
|---|---|---|
| [21] | Appl. No. | 776,438 |
| [22] | Filed | Nov. 18, 1968 |
| [45] | Patented | Aug. 3, 1971 |
| [73] | Assignee | Dainippon Screen Mfg. Co., Ltd.<br>Kyoto, Japan |
| [32] | Priority | Nov. 30, 1967 |
| [33] | | Japan |
| [31] | | 76,396 |

[54] DEVICE FOR CONTROLLING AUTOMATICALLY THE SUCTION ZONES OF VACUUM BACK IN PHOTOMECHANICAL CAMERA (2)
4 Claims, 3 Drawing Figs.

[52] U.S. Cl. ................................................. 355/73,
248/363, 355/76
[51] Int. Cl. ................................................. G03b 27/60
[50] Field of Search ........................................ 355/73, 76;
248/363

[56] References Cited
UNITED STATES PATENTS

| 2,570,668 | 10/1951 | Halpern | 355/76 X |
|---|---|---|---|
| 2,717,756 | 9/1955 | Keeshan et al. | 355/76 X |
| 2,895,706 | 7/1959 | Blatherwick | 355/73 X |
| 3,077,141 | 2/1963 | Wanielista et al. | 355/73 |

*Primary Examiner*—Samuel S. Matthews
*Assistant Examiner*—Richard A. Wintercorn
*Attorney*—Spensley and Horn ABSTRACT: A vacuum back for a photomechanical camera including apparatus for automatically controlling the suction zones of the vacuum back. The vacuum back has a linear vacuum zone which defines the top of the film regardless of film size. The vacuum back is adapted for unilateral movement relative to its mounting so that various sizes of film may be properly centered with respect to the optical axis of the camera. The vacuum back further has a multiplicity of vacuum zones defining increasingly larger film size vacuum regions on the vacuum back. Each of the multiplicity of vacuum zones is connected to one of a multiplicity of vacuum connections on a cylinder connected to and vertically traveling with the vacuum back, so that movement of the vacuum back for properly centering the film also moves the cylinder with respect to a nonmoving piston therein and automatically applies the vacuum to the desired vacuum region.

PATENTED AUG 3 1971

YOSHIO MIYAUCHI
INVENTOR.

BY *Spancley C. Horn*

YOSHIO MIYAUCHI
INVENTOR.
BY Spensley & Horn

DEVICE FOR CONTROLLING AUTOMATICALLY THE SUCTION ZONES OF VACUUM BACK IN PHOTOMECHANICAL CAMERA (2)

BRIEF DESCRIPTION OF THE DRAWINGS

The drawings show an embodiment of this invention whereas.

DETAILED DESCRIPTION OF THE INVENTION

Figure 1:
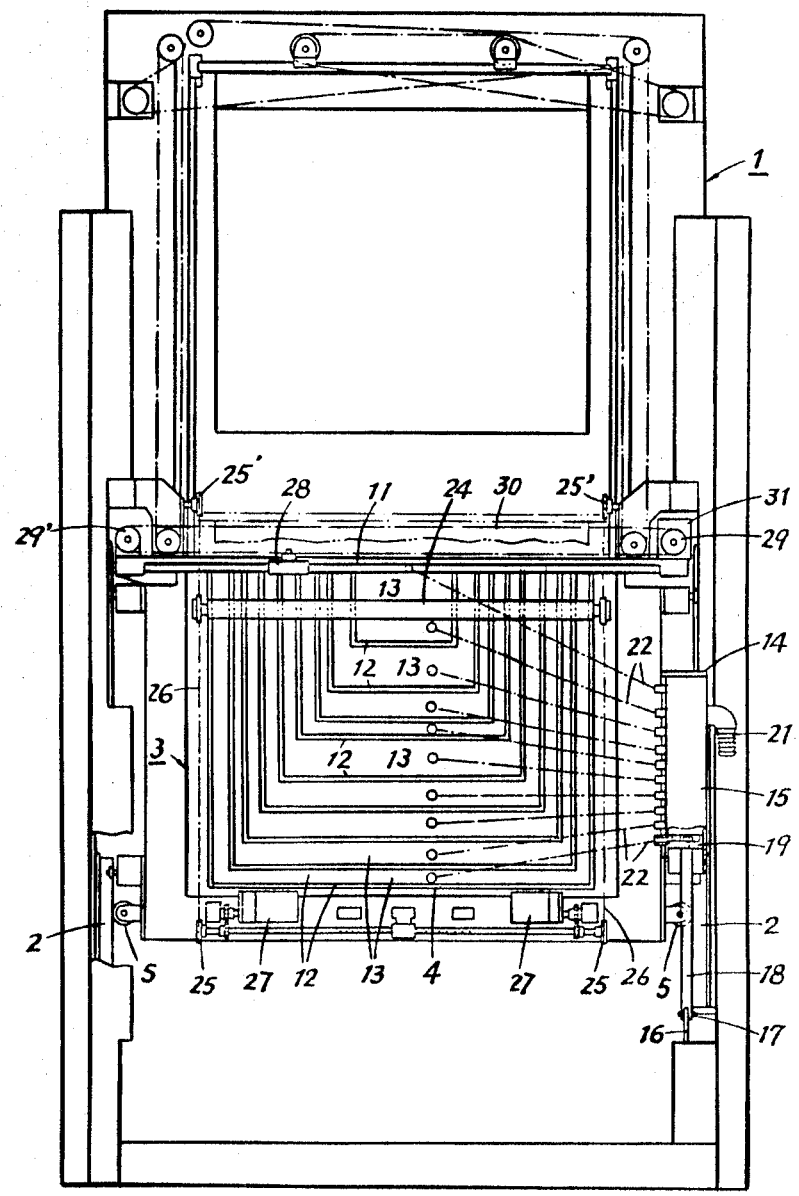
FIG. 1 is the general front view partly broken away.

This invention concerns a device which centers the vacuum back installed in the rear case of a photomechanical camera and simultaneously selects the suction zones of the vacuum back according to the given size of the film to be exposed. The vacuum back is provided with suction zones from the datum edge of the vacuum back so as to aspirate air from within the corridors of the respective zones for vacuum suction and contact of the film against the vacuum back.

To expose the desired image on the surface of a film with a photomechanical camera, perfect contact of the film against the film holding surface of the rear case is required for which a vacuum back is employed.

Owing to the fact that the films used for exposures differ in size and in case that these films are fed automatically from their respective film rolls, it becomes necessary to cut the film at the supply edge of the vacuum back. For this type of camera, the suction zones for vacuum film contact must be formed by a number of grooves of different sizes, each in the shape, for example, of a block letter "U" placed at their respective positions in the vacuum back, the open part of the "U" centered with the middle of and along the datum edge of the vacuum back which is the feeding edge for the film.

Owing to the arrangement of the zones, the position of their respective horizontal centerlines will differ. The size of the zone to be selected must agree with the size of the film to be exposed and the horizontal centerline of the zone must be aligned with the optical axis of the projected image. Ordinarily, these requirements are fulfilled by manual operation of centering the vacuum back and controlling vacuum valves which involves such disadvantages as complicated handling and the requirement of skill.

The device of this invention is for the purpose to eliminate such disadvantages, the details of which are explained below by referring to the attached drawings which are the embodiment of this invention.

A vacuum back 3 with its vacuum surface 4 facing the lens assembly is installed vertically in the lower half part of the rear case 1 riding on guide rails 2, 2 provided along the sides of the rear case 1 through the medium of wheels 5, 5.

Figure 2:
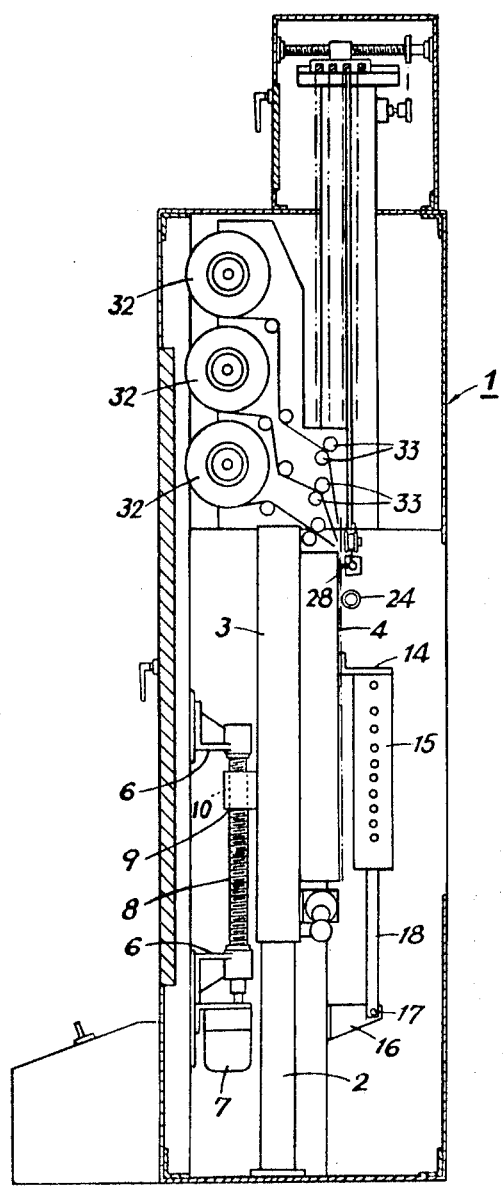
FIG. 2 the general side sectional view.

On one side inside the rear case 1 secured against the rear wall are two bearings 6, 6 aligned vertically which bear a screw 8 between them, the screw 8 being turned in the right or reverse direction by an electric motor 7, (FIG. 2). A guide 9 provided with an internal screw 10 is secured to the rear surface of the vacuum back 3 and the screw 8 passes through it so that when this screw 8 is turned by the motor 7, the vacuum back will move up or down on the guide rails 2, 2 depending on the direction of the rotation of the motor 7.

A straight groove 11 is provided on the upper edge of the surface 4 of the vacuum back 3, (FIG. 1). Grooves 12 are also arranged in the vacuum back 3 in the shape of a block letter "U" from the groove 11 one larger than the other so as to form corridors of the zones 13 for air aspiration.

An angle support 14 is secured on one side of the vacuum back 3 and a cylinder 15, the lower end of which is open, is secured vertically to this angle support 14. Within the cylinder 15 is a piston 19 to which is secured a piston rod 18, the opposite end of which is connected with a projecting piece 16 secured to the rear case 1 by a pin joint 17.

Figure 3:
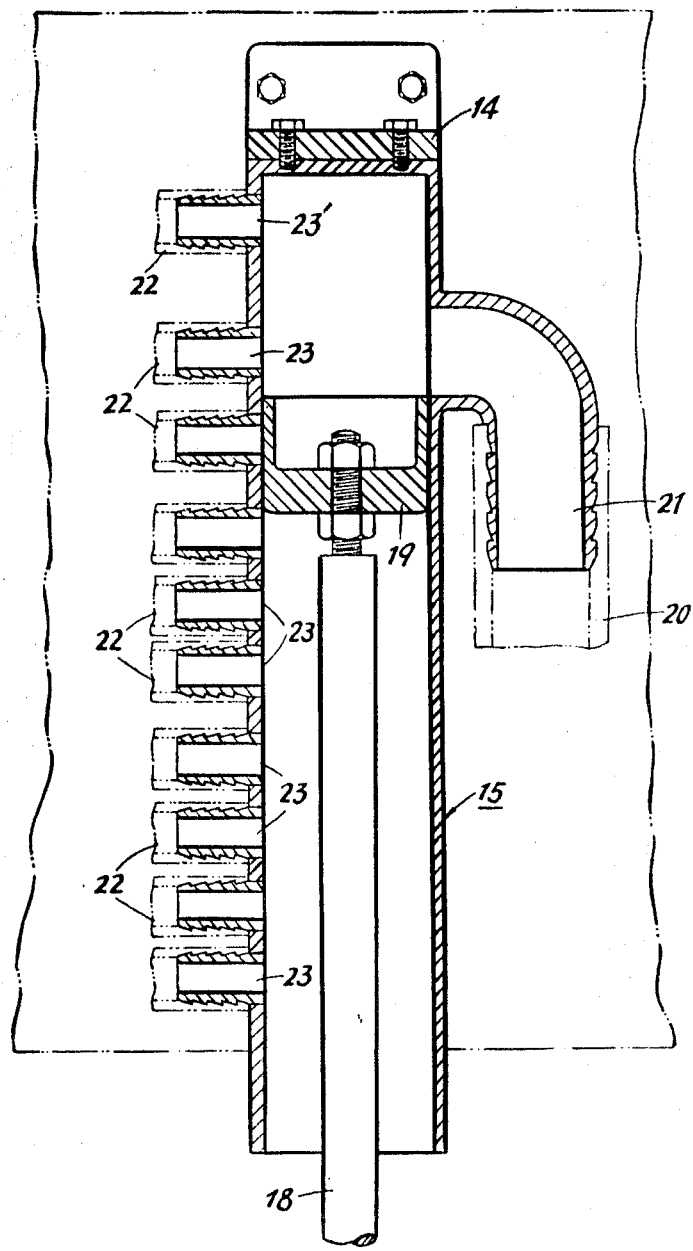
FIG. 3 the front sectional view of the vacuum contact controlling means.

A suction duct 21 is provided at the top part of the cylinder 15 for connecting the cylinder 15 with a vacuum pump (not shown) by a suction hose 20, (FIG. 1 and FIG. 3). Lengthwise on the cylinder 15 on the opposite side to the suction duct 21 is a top opening 23' and a number of openings 23 corresponding to the number of zones 13 on the vacuum back 3, the respective openings 23 being connected to corresponding zones 13 with hoses and the top opening 23' with the groove 11. The distances between the center of the openings 23 of the cylinder 15 relative to the uppermost opening 23 are equivalent to the distances from the centerline of the minimum zone 13 to the centerline of the respective zones 13. Thus, when the vacuum back 3 is moved up or down to align the center of one zone 13 with the optical axis of the projected image, the cylinder 15 which is secured to the vacuum back 3 will move accordingly and displace the piston 19 with respect to the cylinder 15 so that air within the particular zone and in those zones smaller in size than this one will be aspirated through the respective hoses 22, the cylinder 15 and the suction duct 21 for vacuum contact of the film.

A roller 24 reciprocates down and up on the surface 4 of the vacuum back 3, each end of which is connected to a chain 26 of a pair of sprockets 25, 25' provided, one such pair on each side and forward of the vacuum back 3. The roller 24 moves down and up by the direction of revolution of electric motors 27 which turns the sprocket 25.

A cutter 28 for cutting the rollfilm engages and slides along the groove 11 at the upper edge of the surface 4 of the vacuum back 3 and is attached to a chain 30 of sprockets 29, 29' above and forward of the upper part of the vacuum back 3. The sprocket 29 is turned by a motor 31 which revolves for a specific number in both directions by which the cutter 28 is moved back and forth along the groove 11 thereby cutting the film.

Rollfilms 32 are provided in the upper rear part of the rear case 1 and the required length of one of the said rollfilms 32 is fed out by a roller unit 33, 33 in front of the surface 4 of the vacuum back 3.

This invention comprises the construction as explained above by which the film of the required size is vacuum contacted onto the surface of the vacuum back 3 by selecting the size of the zone corresponding to the size of the film. In order to expose the image onto the surface of the film thus contacted, the electric motor 7 is switched on so that the guide 9 engaged to the screw 8 moves up or down thereby moving the vacuum back 3 along the guide rails 2, 2 of the rear case 1 accordingly and the zone 13 on the surface 4 of the vacuum back 3, the size of which corresponds to the size of the film, is centered on the optical axis of the projected image.

By so arranging, the cylinder 15 with openings 23 provided lengthwise along it moves up or down together with the vacuum back 3 and displaces the piston 19 within the cylinder 15 so that the air can be aspirated from within the centered suction zone 13 through the groove 11 and into the cylinder 15. Therefore, after centering the suction zone 13, the required length of the rollfilm 32 is passed out by the roller unit 33, 33, the size of which must correspond to the suction zone 13, to the surface 4 of the vacuum back 3. By switching the vacuum pump on, aspiration of air for vacuum will take place through the suction duct 21 of the cylinder 15 and will cause the rollfilm 32 fed to the surface 4 of the vacuum back 3 to vacuum contact the said surface 4 against the suction zone 13 by suction.

The motors 27 are rotated in the right and reverse directions for a specific number of turns so as to cause the roller 24 to roll down and up the surface of the rollfilm 32 fed to the surface 4 of the vacuum back 3 for perfect contact during or after which the said rollfilm 32 is cut by the cutter 28 at the groove 11 and exposure on the surface of the film is carried out.

After exposure, switch the vacuum pump off and the film will drop away so that the entire process is repeated for consecutive work with the desired size of the film, which can be accomplished with speed by the application of this invention.

For making exposures on films of the same size, an identical length of the rollfilm 32 is fed to the surface 4 of the vacuum back 3. However, for exposures of films of different sizes, all that is required is to center the suction zone 13 which corresponds to the size of the film.

The device of this invention enables vacuum suction automatically through the zones, the size of which corresponds to the size of the film to be exposed, only by centering it.

Although in the explained embodiment of the invention, the groove 11 has dual purposes of film cutting and film suction, it may be limited only to the former purpose. In this case, a separate air passage for vacuum suction may be provided in parallel with and immediately below over a part of or the whole of the length of the groove 11.

The position of the cylinder and piston unit, when installing said unit, can be reversed, i.e., the cylinder head may be installed up or down with the cylinder head or the piston rod secured to the rear case in either instance, whichever is so desired.

The embodiment of this invention refers to a type of photomechanical camera, the exposure by which can be made on its vacuum back in its vertical position; however, it can also be embodied in a photomechanical camera, the vacuum back of which is of the horizontal type with the same resulting efficiency.

I claim:

1. A vacuum back in a photomechanical camera comprising:
  a vacuum film holder installed in the rear case of the camera,
  said holder including a plurality of substantially U-shaped air passages on its front surface, the open ends of said air passages arranged against a common datum edge vacuum passage at one end of said holder perpendicular to the direction of movement of said holder and thereby forming a plurality of rectangular vacuum contact zones with a common datum edge for vacuum retention of film thereon;
  means for imparting unilateral movement to said vacuum film holder in said camera for aligning the center of film with the optical axis of the camera lens;
  a cylinder;
  a piston in said cylinder;
  the axis of said cylinder being aligned with the direction of the movement of said vacuum film holder, and said cylinder and piston mounted for relative movement therebetween in accordance with the movement of said vacuum film holder; and,
  a plurality of openings along said cylinder, connected with said air passages, the number of said openings being substantially equal to the number of said zones, thereby enabling movement of the film holder for aligning the center of the film with the optical axis of the camera lens to select simultaneously the size of the vacuum contact zones to be evacuated in accordance with the size of film being centered.

2. The structure defined in claim 1 wherein the effective distances between the top and other openings is substantially equal to the distances between the center points of the minimum and the other corresponding zones.

3. The structure defined in claim 1 wherein said cylinder is mounted on said vacuum back.

4. The structure defined in claim 1 wherein said camera is a rollfilm camera which dispenses various size films.